(12) United States Patent
Goel et al.

(10) Patent No.: US 8,131,785 B1
(45) Date of Patent: Mar. 6, 2012

(54) FREE SPACE MANAGEMENT FOR HIERARCHICAL DATA DOCUMENT

(75) Inventors: Neeraj Goel, Delhi (IN); Mohit Srivastava, Uttar Pradesh (IN); Asa Whillock, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 336 days.

(21) Appl. No.: 12/471,288

(22) Filed: May 22, 2009

(51) Int. Cl.
G06F 12/00 (2006.01)
G06F 17/30 (2006.01)

(52) U.S. Cl. ........................................ 707/828; 707/829
(58) Field of Classification Search ........................ None
See application file for complete search history.

(56) References Cited

U.S. PATENT DOCUMENTS

| | | | | |
|---|---|---|---|---|
| 5,970,496 | A * | 10/1999 | Katzenberger | 1/1 |
| 6,658,652 | B1 * | 12/2003 | Alexander et al. | 717/128 |
| 2002/0184188 | A1 * | 12/2002 | Mandyam et al. | 707/1 |
| 2003/0188182 | A1 | 10/2003 | Sato et al. | |
| 2006/0075226 | A1 | 4/2006 | Aksu et al. | |
| 2007/0064974 | A1 | 3/2007 | Ayachitula et al. | |

OTHER PUBLICATIONS

OMA, Open Mobile Alliance, "DRM Content Format V2.0", Draft Version 2.0—Apr. 20, 2004, 32 pages.
Unknown Author, "International Standard, ISO/IEC 14496-12, Information Technology—Coding of Audio-Visual Objects, Part 12: ISO Base Media File Format," Second Edition, 2005, 94 pages.

* cited by examiner

*Primary Examiner* — Jay Morrison
(74) *Attorney, Agent, or Firm* — Fish & Richardson P.C.

(57) ABSTRACT

Methods, systems, and apparatus, including encoded computer programs, for using free space set aside in hierarchical data documents, such as multimedia documents containing video and audio data. In one aspect, a method includes obtaining new data to be added to a document having a hierarchical structure, where the document includes stored data and free spaces at different nodes; determining whether a first node in the structure includes a first free space of a size sufficient for the new data; using the first free space in the first node to add the new data to the document when the size is sufficient; and when the size is insufficient: identifying a second node including a second free space in the structure, moving some of the second free space to the first free space, and using the increased first free space in the first node to add the new data to the document.

20 Claims, 6 Drawing Sheets

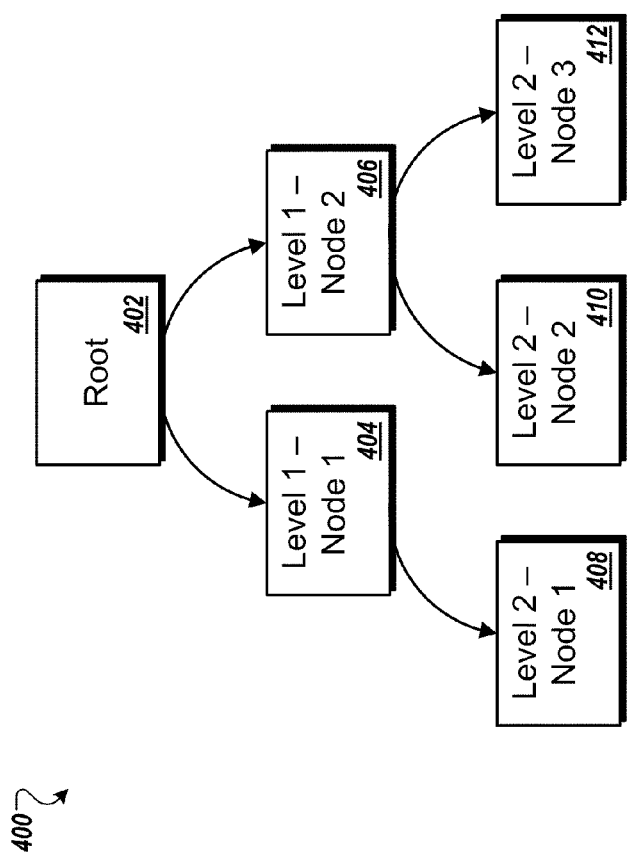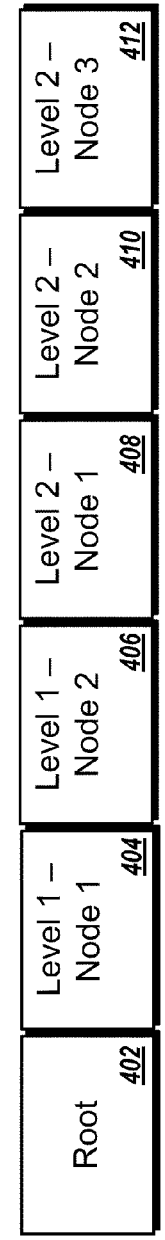
FIG. 4A
FIG. 4B

FREE SPACE MANAGEMENT FOR HIERARCHICAL DATA DOCUMENT

BACKGROUND

This specification relates to use of free space set aside in hierarchical data documents, such as multimedia documents containing video and audio data.

The Internet is widely used to distribute multimedia information, including video and audio data. For example, content delivery networks use the Internet to deliver content to end users. A content delivery network (CDN) is a system of networked computers that cooperate to deliver multimedia documents using the Internet in a manner that can improve performance, scalability, and cost efficiency. The multimedia documents delivered can use various formats, such as MP4 (MPEG-4, Moving Picture Experts Group-4). MP4 documents can conform to the ISO/IEC (International Organization for Standardization/International Electrotechnical Commission) 14496-12:2005(E) standard.

When a multimedia document needs to be updated with new data, sometimes the document includes set aside free space, which can receive the data. Other times, the document is rewritten to accommodate the data. For example, when an editing tool needs to add new multimedia content to an MP4 document, the 'moov' box (or atom) is rewritten for the new document.

SUMMARY

This specification describes technologies relating to using free space set aside in hierarchical data documents, such as multimedia documents containing video and audio data.

In general, one innovative aspect of the subject matter described in this specification can be embodied in methods that include the actions of obtaining new data of a given size to be added to an electronic document conforming to a format including a hierarchical structure, where the electronic document includes stored data and free spaces at different nodes within the hierarchical structure; determining whether a first node in the hierarchical structure includes a first free space of a size sufficient to accommodate the new data of the given size; using the first free space in the first node to add the new data to the electronic document in a storage device when the size of the first free space is sufficient; and when the size of the first free space is insufficient: identifying a second node in the hierarchical structure that includes a second free space, moving at least some of the second free space to the first free space, thereby increasing the size of the first free space, and using the increased first free space in the first node to add the new data to the electronic document in a storage device. Other embodiments of this aspect include corresponding systems, apparatus, and computer programs, configured to perform the actions of the methods, encoded on computer storage devices.

These and other embodiments can each optionally include one or more of the following features. Identifying the second node can include checking sizes of multiple free spaces to find sufficient free space for the new data of the given size, and moving the at least some of the second free space can include rewriting a portion of the electronic document including the multiple free spaces. The hierarchical structure can include multiple levels, identifying the second node can include checking one or more nodes at a peer level of the first node before checking any other levels, and method operations can include checking a total amount of document rewriting to be performed before moving the at least some of the second free space and using the increased first free space.

The hierarchical structure can include a tree data structure linearized in the electronic document, and identifying the second node can include looking for free space in order of distance from the first node in the linearized electronic document. The method operations can include parsing the electronic document to check document validity with respect to the format, where the parsing can include creating a model in memory of the hierarchical structure of the electronic document, and identifying the second node can include checking the model in memory for free space. The format can include a container format, the hierarchical structure can support combinations of different multimedia streams having corresponding different codecs, the stored data can include first media content of a first format having a first corresponding codec, and the method operations can include adding second media content of a second format having a second corresponding codec to the electronic document, where the new data of the given size is associated with the second media content.

Moreover, a system can include a user device; and one or more computers operable to interact with the device and to perform operations of the method. The one or more computers can include a server operable to interact with the device through a data communication network, and the device can be operable to interact with the server as a client. Alternatively, the one or more computers can consist of one computer, the device can be a user interface device, and the one computer can include the user interface device.

Particular embodiments of the subject matter described in this specification can be implemented so as to realize one or more of the following advantages. Data can be appended to a document, such as an MP4 document, with a hierarchical structure without having to rewrite significant portions of the document. Updating a document with new data can be done more quickly, with minimal disturbance of the document. This can be of particular value in the context of a content distribution network, where, in the case of streaming, recording on the server-side should be done rapidly to ensure that data is not lost or delayed. Desirable qualities of the document being updated, such as progressive download, can be readily maintained. Moreover, combining free spaces can be more space efficient and may reduce the overall storage size of the electronic document (e.g., as compared to a document that includes large free spaces at each level of the hierarchical structure).

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 4 is a block diagram showing an example of a document having a hierarchical structure.

DETAILED DESCRIPTION

An electronic document (which for brevity will simply be referred to as a document) may, but need not, correspond to a file. A document may be stored in a portion of a file that holds other documents, in a single file dedicated to the document in question, or in multiple coordinated files.

Figure 1:
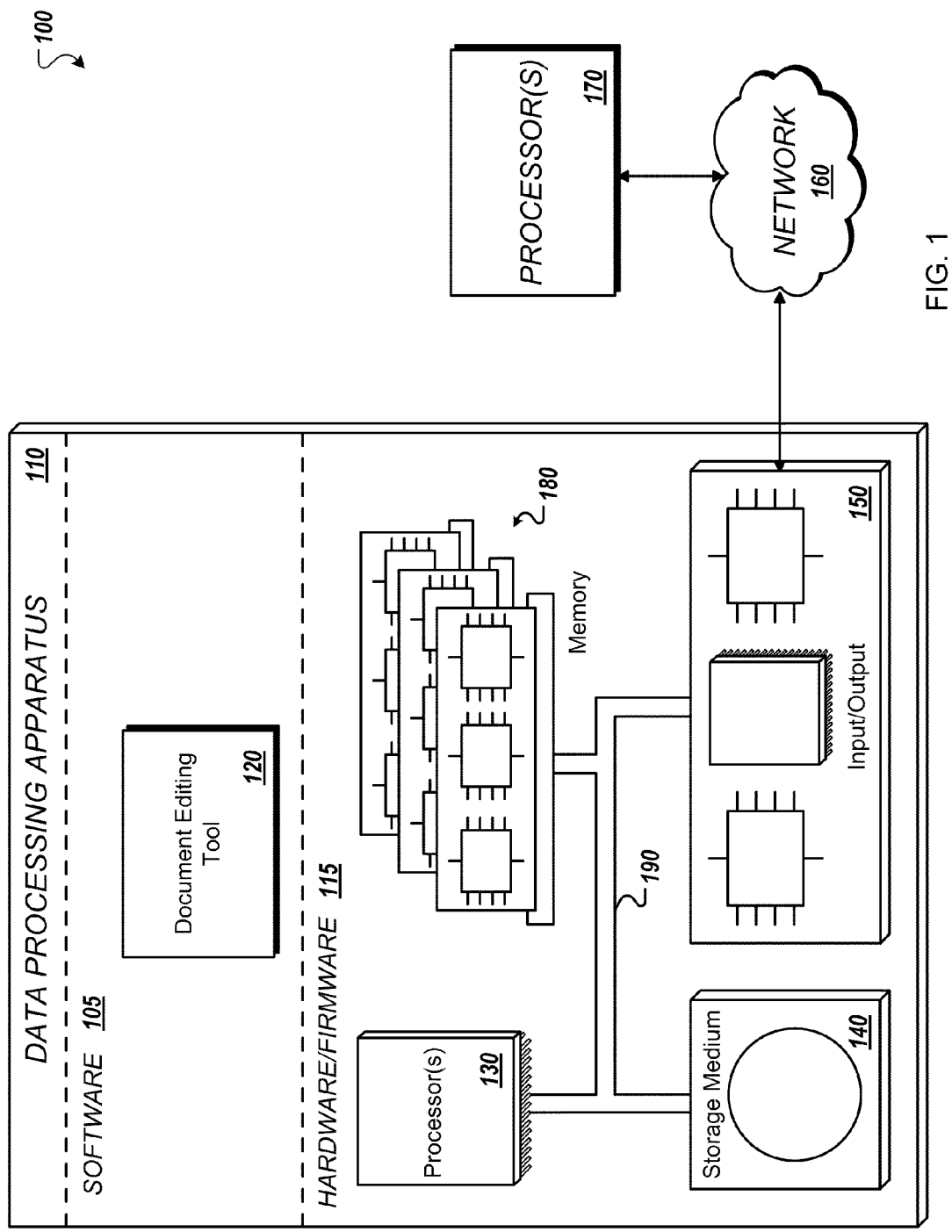
FIG. 1 is a block diagram showing an example computer system including a document editing tool.

FIG. 1 is a block diagram showing an example computer system 100 including a document editing tool 120. A data processing apparatus 110 can include hardware/firmware 115 and one or more software programs 105, including the document editing tool 120. The document editing tool 120 operates in conjunction with the data processing apparatus 110 to effect various operations described in this specification. The document editing tool 120, in combination with the various hardware, firmware, and software components of the data processing apparatus 110, represents one or more structural components in the system 100, in which the algorithms described herein can be embodied.

The document editing tool 120 can be an application for performing modifications upon multimedia documents. An application refers to a computer program that the user perceives as a distinct computer tool used for a defined purpose. An application can be built entirely into an operating system or other operating environment, or it can have different components in different locations (e.g., a remote server). The document editing tool 120 can include or interface with other software such as video editing software, audio editing software, Web design software, or media server software, to name a few examples. For example, the document editing tool 120 can include or interface with software that prepares digital content for distribution within a content delivery network.

Interface software can also be included that operates over a network to interface with other processor(s), such as in a computer used by a digital content provider. For example, the document editing tool 120 can include software methods for enhancing video documents with advertisement content, closed captioning, foreign language subtitles, and/or or security features before the content is distributed to a remote viewer (e.g., over a network 160, copied to a portable medium such as a Compact Disc (CD), Digital Versatile Disc (DVD), Universal Serial Bus (USB) Flash drive, etc.).

The hardware/firmware level 115 of the data processing apparatus 110 includes one or more processors 130, a memory 180, and at least one computer-readable medium 140 (e.g., random access memory, storage device, etc.). The hardware/firmware level 115 can also include one or more input/output devices 150, including one or more user interface devices.

Each of the components 130, 140, 150, and 180 are interconnected using a system bus 190. The processor(s) 130 can process instructions for execution within the system 100. In some implementations, one or more single-threaded processors can be included within the processor(s) 130. In other implementations, one or more multi-threaded processors can be included within the processor(s) 130. In some implementations, the processor(s) 130 can process instructions stored in the memory 180, or on the storage device 140, to display graphical information for a user interface on one of the input/output devices 150.

The memory 180 can be a computer-readable medium used to store information within the system 100 and can include a volatile memory unit, a non-volatile memory unit, or both. The storage device 140 can provide mass storage for the system 100. The storage device 140 can include a floppy disk device, a hard disk device, an optical disk device, or a tape device.

The input/output devices 150 provide input/output operations for the system 100. The input/output devices 150 can include a keyboard, mouse, stylus or pointing device, a display unit for displaying graphical user interfaces, a modem or other networking hardware/firmware, or any combination thereof to name a few examples.

The subject matter described in this specification can also be used in conjunction with other input/output devices, such as a printer or scanner. An input/output device can be used to connect to a network 160, and can furthermore connect to one or more processors 170 via the network 160 (e.g., the Internet).

Therefore, a user of the document editing tool 120 does not need to be local, and may be connecting in a wired or wireless fashion using an internet or intranet connection on a personal computer, personal digital assistant (PDA), smartphone (e.g., a cellular phone including an operating system and advanced computing capabilities), or using other suitable hardware and software at a remote location. For example, a user can access a web interface via the remote processor 170 in order to generate a modified digital content document. In any event, data can be transmitted over the network 160 to/from the data processing apparatus 110. Note that the data processing apparatus 110 can itself be considered a user interface device (e.g., when the document editing tool 120 is delivered by processor(s) 170 as a web service).

The system 100 can be used to add information to a document having a hierarchical structure (e.g., tree structure). A document with a hierarchical structure can be organized into boxes (also referred to as chunks or atoms) of data which are hierarchically linked.

An example of a hierarchically structured document can be a document prepared in a container or wrapper format. The container format can include the actual data and information regarding how the data is stored within the container. In some implementations, the container can wrap one or more types of data including differing file formats which may be extracted, read, and/or executed using different types of algorithms. For example, a container document may contain both audio and video data, such as an MP4 (MPEG-4, Moving Picture Experts Group-4) container or a 3GP (defined by the Third Generation Partnership Project) container.

The algorithm used to store the various data types within the container format may be referred to as a codec (e.g., a coder/decoder). For example, the document editing tool 120 can apply a codec to a hierarchical electronic document to modify the contents of the hierarchical electronic document. In some implementations, the document editing tool 120 can accept any number of data formats for inclusion within an electronic document including, but not limited to, digital audio such as MPEG-1 Audio Layer 3 (MP3) or Windows Media Audio (WMA) formatted data, still images such as the Joint Photographic Experts Group (JPEG) image format, and moving images such as Moving Picture Experts Group formats (e.g., MPEG-1, MPEG-2, or MPEG-4) or Video Coding Experts Group formats (e.g., H.263, H.264, etc.). Some container formats may be specific to one or more types of data formats (e.g., audio containers, video containers, etc.).

The container format can include, in some implementations, a hierarchical structure for storing the various digital formats. For example, an audio container format can be organized to collect individual audio tracks (e.g., songs, sample streams of a single song recording, chapters of a book, log entries of an audio diary, etc.). Each track can include metadata regarding the contents of the individual track (e.g., length, name, formatting, compression type, etc.) and the actual data of the audio recording. The audio container format can additionally include a contents section and/or a bookmarks section. The contents section can include metadata regarding the track content of the container (e.g., artist name, title, starting byte of the storage of each track, length of each track, etc.). A bookmarks section can contain metadata regarding the last point listened to by a user (e.g., before pressing a "stop" or "pause" button, powering off the playing device, etc.). Other hierarchical sections are possible, and each section may be broken down into additional sections of information.

Within the hierarchy of the container format, in some implementations, each section can be represented by a node position within the hierarchical structure. For example, in a tree structure, a root node of contents can include child nodes representing each track of the audio container. Each track node can also have child nodes. In some implementations, information within each node (e.g., track metadata, track audio data) can be stored within individual data boxes (chunks, atoms).

Free boxes may be available at different node levels. The free boxes provide space for modifying the contents of the container format. For example, when adding a track to an audio container, the header node can be updated with the starting location of the new track information. When creating the audio container, in some implementations, one or more free boxes can be automatically allocated to the header node to provide space for these potential modifications. If a free box is available at the header node, for example, the audio container can be appended without rewriting the complete file. If a free box is not available at the desired node (e.g., a free box is available within a track node but not within the header node), or if the free box at the desired node is not large enough to contain the additional information being written to the audio container, a portion of a free box located at a different position within the hierarchical structure can be shifted to the desired node by rewriting a portion of the container.

Figure 2:
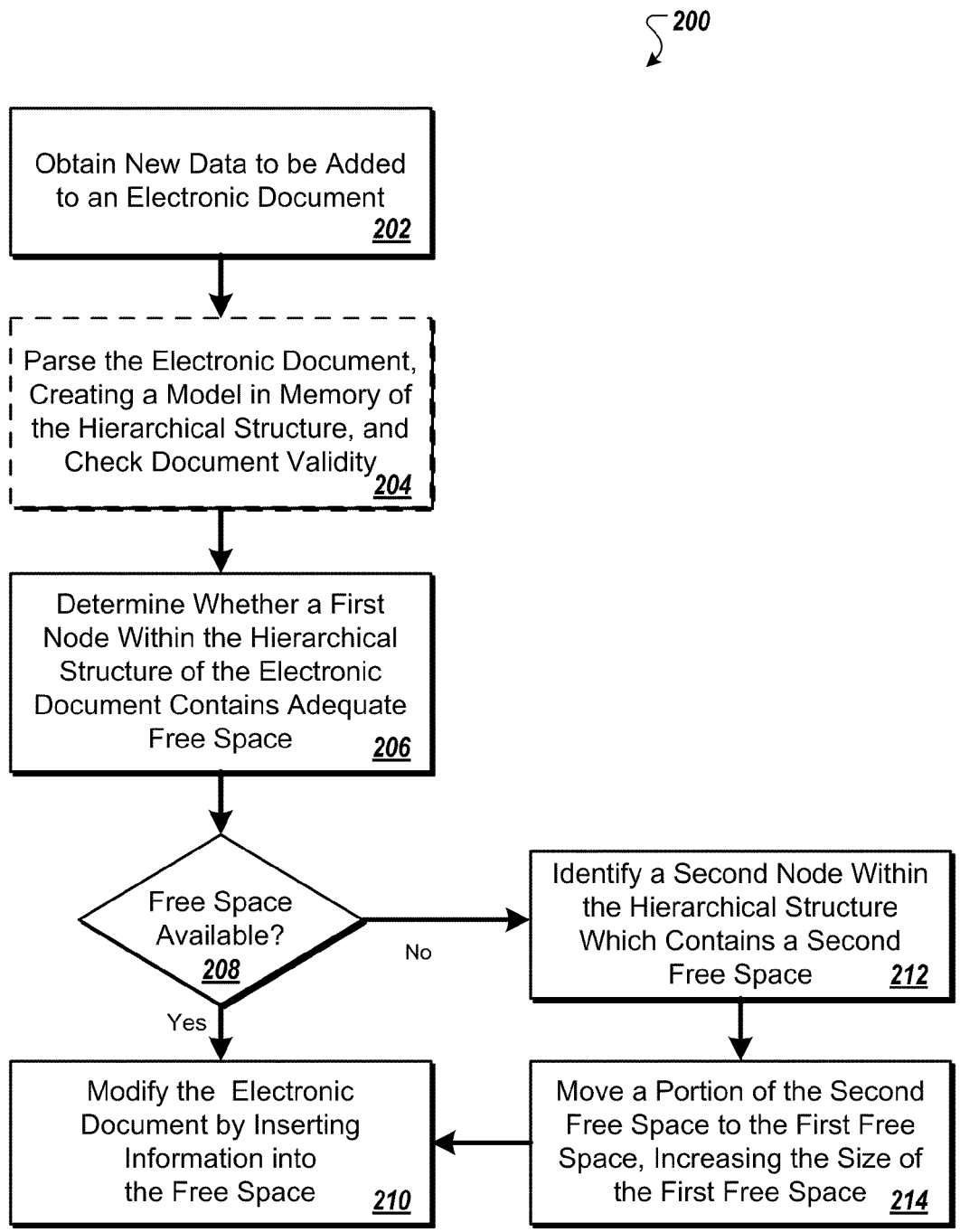
FIG. 2 is a flowchart showing an example process of adding new data to a document having a hierarchical structure.

FIG. 2 is a flowchart showing an example process 200 of adding new data to a document having a hierarchical structure. For example, the process 200 can be implemented by the document editing tool 120 as described in relation to system 100 of FIG. 1. The process 200 can increase the speed and/or reduce the complexity of making modifications to a hierarchical document such as a digital container format by updating internal hierarchical data structures (e.g., involving one or more free boxes located at one or more nodes within the document hierarchy) while rewriting only a portion of the document rather than rewriting the entire document.

New data to be added to an electronic document is obtained (202). The data, for example, can have a size and a type of information. The data type can correlate to a certain level or node placement within the hierarchical structure of the document. For example, the data can correlate to the modification of a video track. According to the document codec, the data type can belong within the track node.

The data, in some implementations, can be received by the process 200 from an outside source (e.g., coordinating software application or digital information transfer process). In other implementations, the data can be generated by the process 200 or by another process within the same application. For example, the data can represent metadata related to modifications being made to the document using the document editing tool 120, or the data can correspond to a file being appended to the electronic document by the document editing tool 120.

The electronic document can optionally be parsed (204) to check the validity of the document. The validity checking, for example, can include verifying that the metadata information and the document contents match (e.g., in data length, data type, etc.). The electronic document can be verified for containing expected content types (e.g., audio or video storage algorithms if a multimedia document). Other validation means are possible. In some implementations, the process 200 can be aborted if the electronic document is discovered to be invalid.

During parsing, a model of the hierarchical structure of the electronic document can optionally be created in memory. The model can include, for example, the size and position of the nodes and/or boxes within the digital container. The model can additionally include links between the various nodes and/or boxes within the hierarchical format. In some implementations, the model can represent the entire electronic document. In other implementations, the model can represent only a portion of the electronic document, such as a model that indicates where free spaces can be found within the hierarchical structure of the electronic document.

A first node within the hierarchical structure of the electronic document having free space can be found and a determination (206) as to whether or not the node contains adequate free space for appending the new data. The free space, for example, can be a free box (chunk, atom) within the container formatted document. If a model of the hierarchical structure was created (204) in memory, the contents of the model can be reviewed to locate a free box. Alternatively, the electronic document can be processed directly when looking for free space.

In some implementations, node checking can begin with a node associated with the storage of the type of data received. For example, if the data contains subtitle information associated with a particular track of a video, the node checking can begin with the node assigned to storing text information associated with the particular track of video. In other implementations, the node checking can begin at other locations within the hierarchical structure.

In any case, the node checking proceeds until a first node having free space is found and then a determination (206) is made as to whether that node has adequate free space. The electronic document can be searched for one or more free boxes closest to the desired node location. For example, the neighboring peer nodes can be checked first, then the parent or child node levels, then the grandparent or grandchild node levels, and so on, each time moving further from the node which is to undergo editing. In some implementations, if a hierarchical model was created (204), the hierarchical model can be checked for available free boxes. In other implementations, the electronic document can be reviewed upon the computer-readable media where it is stored to locate free boxes.

If free space large enough to contain the new data is located (208), the electronic document can by modified (210) by inserting information related to the new data within the free space. Modification of the electronic document, for example, can include a partial file write within the location of the free box. Moreover, if the free space found is not in the desired location within the hierarchical structure for the new data, some or all of the free space can be moved to the desired location, for use in storing the new data, by partially rewriting the relevant portion(s) of the document.

If adequate free space has not yet been located (208), a second node can be identified (212) within the hierarchical structure which contains a second free space. The electronic document can be searched for one or more free boxes closest to the desired node location. For example, the neighboring peer nodes can be checked first, then the parent or child node levels, then the grandparent or grandchild node levels, and so on, each time moving further from the node which is to undergo editing. In some implementations, if a hierarchical model was created (204), the hierarchical model can be checked for available free boxes. In other implementations, the electronic document can be reviewed upon the computer-readable media where it is stored to locate free boxes.

The second node can have a second free space at least as large as the difference between the size of the free space at the first node and the size required for appending the new data. Once the second node having an adequately-sized free space has been located, some or all of the second free space can be moved (214) to increase the size of the first free space (the amount of space moved can depend on the amount needed to store the new data). This can be done separate from, or in combination with, modifying (210) the electronic document by inserting information related to the new data using the increased free space. In any case, the modification (210) can include partially rewriting the relevant portion(s) of the document.

When relocating the free space from the second node to the first node, a portion of the file can be rewritten to modify the position of the free boxes enclosed by the first free box and the second free box. For example, if the second node is positioned further in the electronic document from the desired location than the first node (e.g., a later peer, child, grandchild, etc.), then each box prior to the second free box, up to the first free box, can be shifted within the electronic document by the size of the portion of the second free box which is being reallocated to the first node. If the second node is positioned earlier in the electronic document than the first node (e.g., a former peer, parent, grandparent, etc.), then each box after the second free box, up to the first free box or up to the desired location for the new data, can be shifted within the electronic document by the size of the portion of the second free box which is being reallocated to store the new data. In some implementations, intervening nodes can be relocated in a similar fashion to aid in the repositioning of the second free box. Moreover, in some implementations, more than two free spaces can be coalesced in the manner described above to create an adequately sized free space at the desired location in the document.

In some implementations, the operations of the process 200 can be done in different order, some operations can be combined, or the process 200 can contain additional operations. For example, the new data can be appended to the free space during the repositioning of the second free space. If the new data (e.g., file) includes one or more portions (e.g., metadata, etc.) belonging at different hierarchical levels, a portion of the process can be repeated accordingly. In some implementations, if the process 200 recognizes initially that free space is needed at a number of nodes within the hierarchy of the electronic document, the process 200 can consider future free space needs when determining whether or not to relocate free space from a given node. For example, if the new data includes a modification to two or more video tracks, the process 200 can search for free space at a different hierarchical level rather than borrowing free space from a peer track which is pending modification.

In some implementations, a complexity assessment can be made prior to coalescing two or more free spaces. For example, if there is a large number of intervening data boxes between the two free boxes, it can be preferable to rewrite the entire file than to coalesce the two free spaces via a partial file rewrite.

Figure 3:
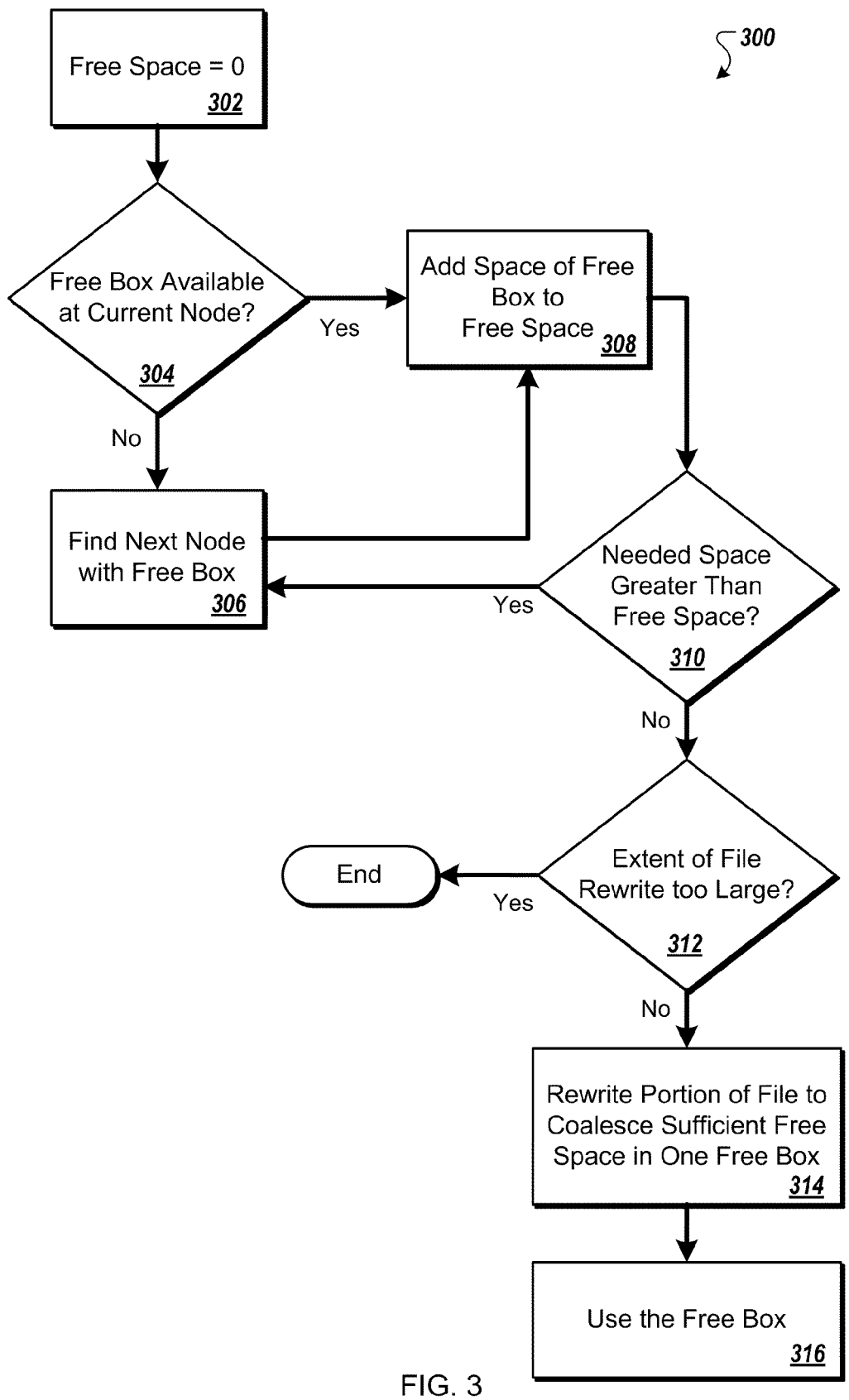
FIG. 3 is a flowchart showing another example process of adding new data to a document having a hierarchical structure.

FIG. 3 is a flowchart showing another example process 300 of adding new data to a document having a hierarchical structure. The process 300 can be used to locate adequate free space within an electronic document for appending new data of a predetermined size to a predetermined node of the hierarchical structure. The process 300 begins with initializing (302) a free space size. The free space size, in some implementations, can be a software variable which tracks the amount of free space found within the electronic document. The free space size, for example, can be compared to the size of the new data to be appended to the electronic document.

The electronic document can be checked (304) for a free box available at the current node. The current node can start with an originating node within the hierarchy which is being modified. For example, the originating node can be associated with the description node of a sample stream of an audio track within a container formatted multimedia document. If a model of the electronic document has been created within memory, the model can be checked for free space. Otherwise, the electronic document can be read directly to find free space.

If a free box has not been located at the current node, the next node in the electronic document with a free box is found (306). The next node, for example, can be the node nearest the originating node which contains a free box. The next node can, in some implementations, equate to the node closest in bit position to the current node as stored within the electronic document. The process 300 continues to check nodes until a node with a free box is located. In some implementations, the next node can increment through each peer node of the originating node, then each child and parent node of the originating node, then each grandchild and grandparent node of the originating node, and so on seeking sequentially further from the originating node. In some implementations, the algorithm used for accessing the next node can place preference on a certain order of perusing the hierarchy (e.g., peers first, children second, parent third). In other implementations, the algorithm can take into account those nodes which are frequently modified. For example, if the bookmark node of the electronic document tends to be frequently modified, the algorithm can skip the bookmark node rather than attempting to borrow free space from that location.

Once a free box has been located, the size of the free box located can be added (308) to the free space size to calculate a cumulative free space size. The location of the free box can also be noted by the process 300 (e.g., stored within a temporary storage in memory). The cumulative free space size can be compared (310) to the required free space size. If the needed space is greater than the cumulative free space located so far, the process 300 can return to finding (306) the next node containing a free box.

When the cumulative free space is equal to or greater than the required free space, the extent of the file rewrite needed to concatenate the free spaces can be determined (312). For example, the size of a potential file rewrite can be calculated as the distance (e.g., in boxes, bits, or bytes) between the first node (e.g., the node nearest to the beginning of the electronic document) and the last node (e.g., the node furthest from the beginning of the electronic document) involved in the coalescing of free space.

In some implementations, the last free space located may not be the free space furthest (e.g., in bits, bytes, or boxes) from the originating node. For example, if the originating node has many peer nodes, the peer nodes are reviewed first for free space, but don't have sufficient free space, the process may then look for free space in a parent node. The parent node may have sufficient free space to make the total cumulative free space adequate for the new data, and thus the last free space located (from a parent node) may be closer to the originating node than the second to last free space located (from a distant peer node).

Any number of nodes can be involved within the rewriting of the file. For example, if the first two peers of the originating node had no free space, but the third peer had free space available, the originating node, the third peer node, and the two intervening peer nodes can all be rewritten at the file level to combine the free space.

In addition to determining the extent of the file rewrite, the percentage of the size of the file rewrite can be calculated to determine how much of the total file is affected. Other variables, in some implementations, can also be considered including, but not limited to, the total remaining free space within the electronic document, the total number of boxes being rewritten, the total number of nodes being rewritten, and/or the levels of document hierarchy involved in the rewrite.

If the extent of the file rewrite is determined to be too great, the process 300 can be aborted before any portion of the electronic document has been rewritten. In some circumstances, a total file rewrite can be deemed preferable (e.g., less time-consuming, fewer processing cycles required). In one example, if very little free space will exist within the electronic document after having coalesced free space and appended data, it can be determined beneficial to instead rewrite the entire file and to insert additional free spaces amongst the document nodes.

Otherwise, the portion of the document containing free boxes involved in producing an adequate free space can be rewritten (314) such that the free boxes are coalesced at the desired node location. The coalescing process can create a free box, which is sized at least large enough to contain the new data which is being added to the electronic document.

The free box can be used (316) to store the new data. In some implementations, additional free box space can remain at the originating node after the new data has been added. For example, if complete free boxes have been coalesced rather than one or more partial free boxes, the cumulative size of the free space created at the originating node can be greater than the space needed to add the new data. Moreover, rewriting (314) the document and using (316) the free box can be combined into one operation that rewrites the document and adds the new data at the same time.

FIGS. 4A and 4B are block diagrams showing an example of a document having a hierarchical structure. As shown in FIG. 4A, a tree structure 400 includes a root node 402 at the top hierarchical level and a first level-1 node 404 and a second level-1 node 406 at a second hierarchical level (e.g., children of the root node 402). The first level-1 node 404 is linked to a first level-2 node 408 (e.g., a child of the first level-1 node 404) at a third hierarchical level. The second level-1 node 406 is similarly linked to a second level-2 node 410 and a third level-2 node 412 (e.g., children of the second level-1 node 406) at the third hierarchical level.

Within a tree structure, there can be any number of hierarchical levels. Similarly, there can be any number of nodes at each hierarchical level. Each node can contain one or more boxes (atoms, chunks). The nodes 402 through 412, for example, can each contain both data boxes and free space boxes.

As shown in FIG. 4B, a linearized hierarchical structure 450 illustrates an exemplary positioning of the root node 402, the level-1 nodes 404 and 406, and the level-2 nodes 408, 410, and 412 as can be arranged within the byte structure of an electronic file (e.g., container format document). The root node 402 is closest (e.g., in byte space) to the first level-1 node 404, while the first level-1 node 404 is closest to the second level-1 node 406 rather than its child node, the first level-2 node 408. This method of exemplary positioning can be described as a breadth-first linear layout of the hierarchical structure. In other implementations, a depth-first linear layout can instead be utilized. Other linear models are possible.

Within the breadth-first linear layout of FIG. 4B, if the first level-1 node 404 needs additional free space, the process 200 (as described in relation to FIG. 2) or the process 300 (as described in relation to FIG. 3) can first check the peer node (e.g., the second level-1 node 406) and then the parent node (e.g., the root node 402) before the child node (e.g., the first level-2 node 408) because both the peer node (second level-1 node 406) and the parent node (root node 402) are linearly closer to the first level-1 node 404 than the child node (first level-2 node 408). If, for example, additional free space were located within the root node 402, a portion of the root node 402 and the first level-1 node 404 could be rewritten to combine the free space. In another example, if additional free space were located within the child node (e.g., the first level-2 node 408), a portion of the first level-1 node 404, the second level-1 node 406, and the first level-1 node 408 could all be rewritten to coalesce the free space.

Figure 5:
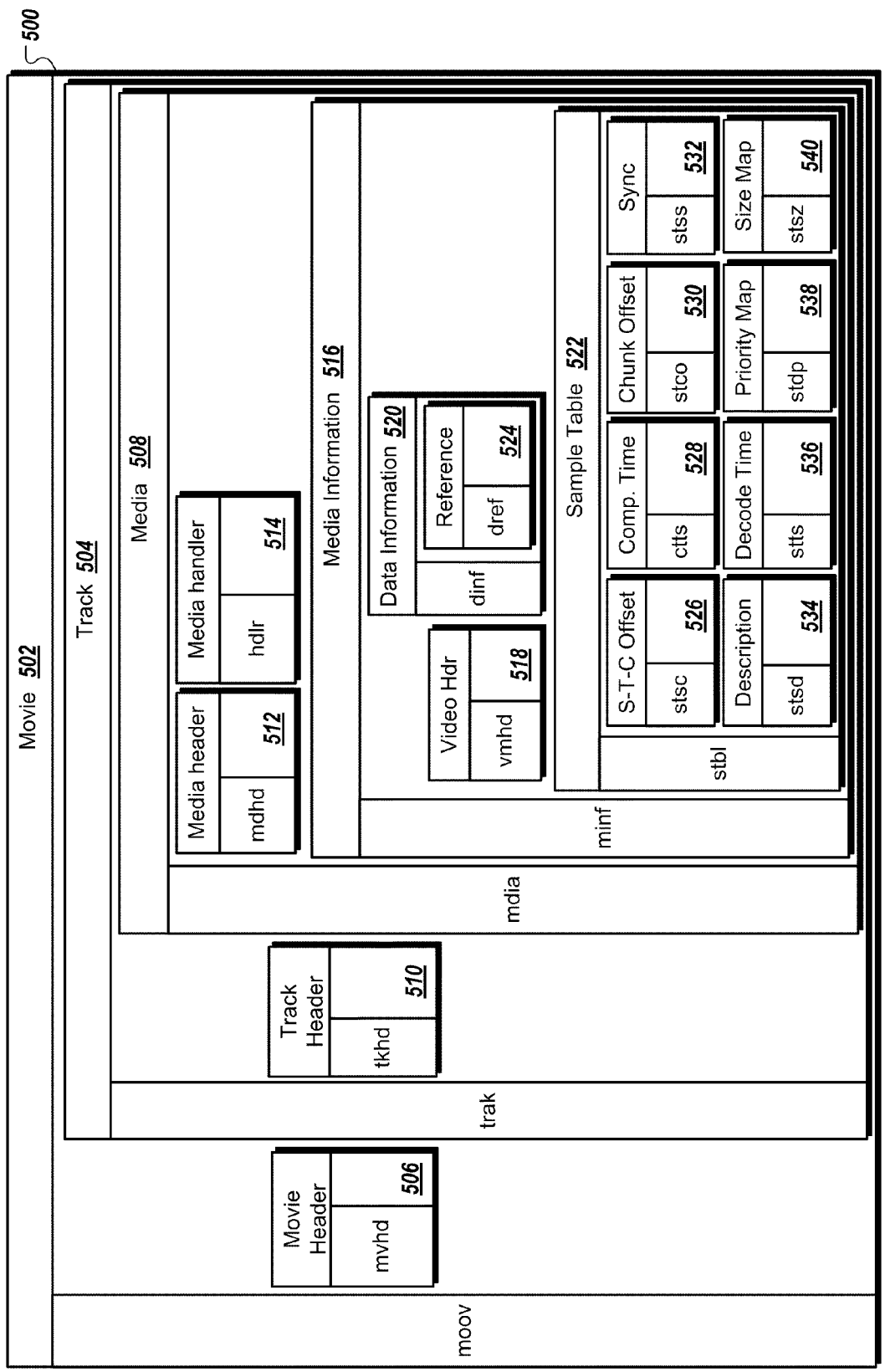
FIG. 5 is a block diagram showing another example of a document having a hierarchical structure.

FIG. 5 is a block diagram showing another example of a document 500 having a hierarchical structure. The document 500, for example, can represent a portion of the MP4 container format. The MP4 container format provides a structure for wrapping audio and visual content such as video, still images, and sound tracks (e.g., voice file correlating to video images, background music for still image slideshow, etc.). Other text, graphics, and audio-visual information can be included within an MP4 container document.

The document 500 includes hierarchical nodes describing a movie. A movie node moov 502 represents the root node of the document 500. The moov 502, for example, can represent the International Organization for Standardization/International Electrotechnical Commission (ISO/IEC) Joint Technical Committee coded container "moov" which can be used to contain metadata associated with a video. The moov 502 has a track child node trak 504 and a movie header child node mvhd 506. The mvhd 506, for example, can include general declarations regarding the video described by the moov 502. The trak 504, for example, can represent an individual track of video (e.g., movie chapter, video stream). The moov 502, in some examples, can contain more tracks than the illustrated trak 504 (e.g., peer tracks).

The trak 504 includes a track header child node tkhd 510 and a media child node mdia 508. The mdia 508, for example, can describe the contents of a particular track (e.g., the type of formatting used). The mdia 508 has a media header child node mdhd 512, a media handler child node hdlr 514, and a media information child node minf 516.

The minf 516 has a video header child node vmhd 518, a data information child node dinf 520, and a sample table child node stbl 522. The dinf 520 contains a reference child node dref 524. The stbl 522 contains a sample-to-chunk offset child node stsc 526, a composition time child node ctts 528, a chunk offset child node stco 530, a sync sample table child node stss 532, a description child node stsd 534, a decode time child node stts 536, a priority map child node stdp 538, and a size map child node stsz 540.

Other nodes can be possible at each hierarchical level of the document 500. The distribution of nodes within the document 500, for example, can depend upon the codec used. The nodes 502 through 540, for example, can represent exemplary ISO standard nodes. Some nodes can differ based upon using a different codec such as, in some examples, the Advanced Video Coding (AVC) format, the Motion JPEG 2000 (MJ2) format, a version of the Open Mobile Alliance Digital Rights Management (OMA DRM) format or a version of the 3rd Generation Partnership Project (3GPP) format.

When modifying a hierarchical container document such as the document 500, one or more nodes can be affected. For example, if a track is reformatted using a different compression technique, both the track information within the trak 504 (e.g., the length of the track) and the media type within the minf 514 (e.g., stipulating the compression technique applied) can be modified. Other modifications are possible (e.g., modified size map within stsz 540, modified offsets within the stsc 526 and/or the stco 530, etc.).

Free boxes can be available at one or more of the nodes of the document 500. In some implementations, free boxes can be inserted into the document 500 upon generation. For example, one or more free boxes can be strategically located in node positions which are likely to be modified or appended.

Figure 6:
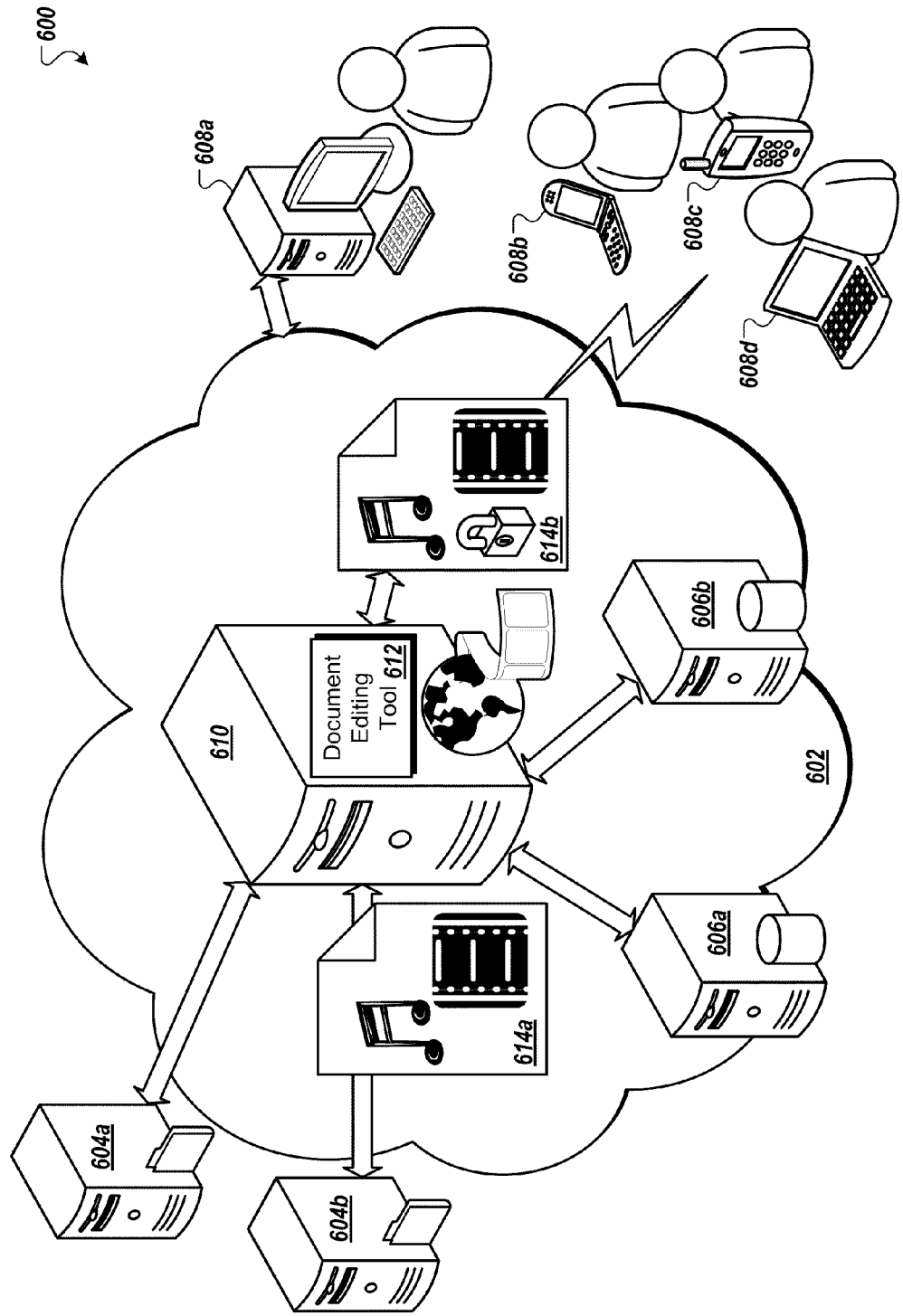
FIG. 6 is a block diagram showing another example computer system including a document editing tool.

FIG. 6 is a block diagram showing another example computer system 600 including a document editing tool 612. The computer system 600 includes a content delivery network (CDN) 602 for distributing multimedia content. Content delivery networks can be used to replicate digital content to a number of edge servers which are used to quickly distribute the duplicate content items to nearby users (e.g., closest in proximity or in network hops). Through mirroring content amongst a collection of edge servers, a CDN can quickly disseminate multimedia content to a diversely positioned user base by having the nearest server in proximity to the user supply the desired content. In the situation of a partial network failure, remaining online edge servers can continue to supply content to the user base.

The CDN 602, for example, can be used to distribute multimedia digital content through a network such as an internet service provider (ISP) network, a mobile device network, an Internet television (IPTV) broadcasting network, or other public or private digital network. The CDN 602 can receive content from content providers, for example from a first content provider server 604a or a second content provider server 604b. The content provider servers 604, in some examples, can be associated with film studios, record labels, television or cable TV providers, or advertisers.

The content which the content provider servers 604 deliver to the CDN 602 can include, in some examples, audio, visual, or multimedia digital content documents. Although the content provider servers 604 are illustrated as being outside the CDN 602, in some implementations one or more content provider servers 604 can be included within the CDN 602. For example, a cable TV provider can have an IPTV CDN including one or more content provider servers for generating TV content. Advertisements can be received from one or more advertisement content provider servers outside of the IPTV CDN and combined with the content generated by the IPTV CDN.

The CDN 602 can distribute content received from the content provider servers 604 to a first content storage server 606a and a second content storage server 606b. In some implementations, the CDN 602 can have any number of (physically distributed) content storage servers 606 to replicate multimedia content and to distribute this content to the user base of the CDN 602.

The user base of the CDN 602 can include any number or variety of user devices 608, such as a personal computer 608a, a smartphone 608b, a PDA 608c, and a notebook computer 608d. The user devices 608 can connect to the CDN 602 in a wireless or wired manner. In one example, the user devices 608 can access the CDN via an Internet browser. The users of the CDN 602, in some implementations, can access the CDN 602 through a personal user account. For example, each user can be provided with an identification code and security code for access to the CDN 602. In some implementations, the user devices 608 can be used to upload content to the CDN 602 as well as receiving content from the CDN 602.

The CDN 602 includes a media server 610 which contains the document editing tool 612. The media server 610, for example, can be accessed by an authorized user to modify digital content or to generate new digital content using the document editing tool 612. In some implementations, the document editing tool 612 can be used to modify digital content which the CDN 602 has received from one or more of the content provider servers 604. For example, the media server 610 can receive a digital content document 614a directly from the content provider server 604b or retrieve a copy of the digital content document 614a which the CDN 602 received from the content provider server 604b and stored within the content storage server 606a. The document editing tool 612 can be used, in some examples, to add advertisements, security content, or watermarking to the digital content document 614a.

The document editing tool 612 produces a modified electronic document 614b which can be distributed directly to one or more users 608 by the media server 610 or copied to one or more storage servers 606. The electronic document 614a, in some implementations, can be retrieved from the content provider server 604b or the content storage server 606a, modified to introduce personalized content (e.g., targeted advertisements), and the modified electronic document 614b can be delivered to the requesting user 608d in real time. In some implementations, the CDN 602 can include any number of media servers that modify and distribute digital content. For example, each content storage server 606 can include a copy of the document editing tool 612.

The document editing tool 612 can include the capability to modify hierarchically structured electronic documents such as multimedia container documents by searching for and coalescing free space within the hierarchical structure. In some implementations, using the document editing tool 612, an authorized user can modify MP4 formatted content, including video and audio streams employing various algorithms. For example, when appending to an MP4 file, the document editing tool 612 can be used to rewrite the moov node of the ISO/IEC MP4 codec (e.g., the moov 502 as described in FIG. 5) due to modifications being made to a child node of the moov node such as the track node (e.g., the trak 504) and/or the description node (e.g., the stsd 534). Due to the act of rewriting the moov node, the moov node can be relocated within the MP4 file. During progressive download, for example, it is beneficial to have the moov box near the beginning of the file. Data can be otherwise lost when being streamed from the server (e.g., the media server 610) to a user (e.g., the user 608d). When modifying or appending to MP4 content, in some cases, the document editing tool 612 can alter the contents of the moov node to add metadata associated with the appended content without the need to rewrite the entire moov node within the MP4 document. The document editing tool 612 can achieve the modification, instead, through adding information to one or more free boxes located within the moov node. For example, the document editing tool can use the process 200 as described in relation to FIG. 2 and/or the process 300 as described in relation to FIG. 3 to reallocate free space within the moov node of an MP4 document.

In some implementations, the document editing tool 612 can be used to append content of the same type as the original content but formatted with a different algorithm. For example, the document editing tool 612 can receive an MP4 electronic document including video formatted using the Telecommunication Standardization Sector (ITU-T) Video Coding Experts Group (VCEG) H.264 codec. If an authorized user appends video content to the MP4 document which is formatted using the H.263 codec, the description node (e.g., the stsd 534) can be updated to store additional sample descriptions. If the document editing tool 612 can locate or combine adequate free space into the stsd 534, for example, the MP4 document can be appended without rewriting the moov node.

In other implementations, the document editing tool 612 can be used to append a new type of content. For example, beginning with an MP4 document containing one or more video tracks, a user can append audio content. The audio content, for example, can be stored within a new track node (e.g., in addition to trak 504). If sufficient free space can be located within hierarchical positions surrounding the track level of the movie hierarchy (e.g., through combining free boxes located within the trak 504, moov 502, media 508, and/or media information 516, etc.), a new track node can be constructed and populated with the audio information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a document in a document system. A program can be stored in a portion of a document that holds other programs or data (e.g., one or more scripts stored in a markup language document), in a single document dedicated to the program in question, or in multiple coordinated documents (e.g., documents that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    obtaining new data of a given size to be added to an electronic document conforming to a format comprising a hierarchical structure, where the electronic document includes stored data and free spaces at different nodes within the hierarchical structure;
    determining whether a first node in the hierarchical structure includes a first free space of a size sufficient to accommodate the new data of the given size;
    using the first free space in the first node to add the new data to the electronic document in a storage device when the size of the first free space is sufficient; and
    when the size of the first free space is insufficient:
        identifying a second node in the hierarchical structure that includes a second free space,
        moving at least some of the second free space to the first free space, thereby increasing the size of the first free space, and
        using the increased first free space in the first node to add the new data to the electronic document in a storage device.

2. The method of claim 1, where identifying the second node comprises checking sizes of multiple free spaces to find sufficient free space for the new data of the given size, and moving the at least some of the second free space comprises rewriting a portion of the electronic document including the multiple free spaces.

3. The method of claim 1, where the hierarchical structure comprises multiple levels, identifying the second node comprises checking one or more nodes at a peer level of the first node before checking any other levels, and the method comprises checking a total amount of document rewriting to be performed before moving the at least some of the second free space and using the increased first free space.

4. The method of claim 1, where the hierarchical structure comprises a tree data structure linearized in the electronic document, and identifying the second node comprises looking for free space in order of distance from the first node in the linearized electronic document.

5. The method of claim 1, comprising parsing the electronic document to check document validity with respect to the format, where the parsing comprises creating a model in memory of the hierarchical structure of the electronic document, and identifying the second node comprises checking the model in memory for free space.

6. The method of claim 5, where the format comprises a container format, the hierarchical structure supports combinations of different multimedia streams having corresponding different codecs, the stored data comprises first media content of a first format having a first corresponding codec, and the method comprises adding second media content of a second format having a second corresponding codec to the electronic document, where the new data of the given size is associated with the second media content.

7. A computer storage medium encoded with a computer program, the program comprising instructions that when executed by data processing apparatus cause the data processing apparatus to perform operations comprising:
obtaining new data of a given size to be added to an electronic document conforming to a format comprising a hierarchical structure, where the electronic document includes stored data and free spaces at different nodes within the hierarchical structure;
determining whether a first node in the hierarchical structure includes a first free space of a size sufficient to accommodate the new data of the given size;
using the first free space in the first node to add the new data to the electronic document in a storage device when the size of the first free space is sufficient; and
when the size of the first free space is insufficient:
identifying a second node in the hierarchical structure that includes a second free space,
moving at least some of the second free space to the first free space, thereby increasing the size of the first free space, and
using the increased first free space in the first node to add the new data to the electronic document in a storage device.

8. The computer storage medium of claim 7, where identifying the second node comprises checking sizes of multiple free spaces to find sufficient free space for the new data of the given size, and moving the at least some of the second free space comprises rewriting a portion of the electronic document including the multiple free spaces.

9. The computer storage medium of claim 7, where the hierarchical structure comprises multiple levels, identifying the second node comprises checking one or more nodes at a peer level of the first node before checking any other levels, and the operations comprise checking a total amount of document rewriting to be performed before moving the at least some of the second free space and using the increased first free space.

10. The computer storage medium of claim 7, where the hierarchical structure comprises a tree data structure linearized in the electronic document, and identifying the second node comprises looking for free space in order of distance from the first node in the linearized electronic document.

11. The computer storage medium of claim 7, the operations comprising parsing the electronic document to check document validity with respect to the format, where the parsing comprises creating a model in memory of the hierarchical structure of the electronic document, and identifying the second node comprises checking the model in memory for free space.

12. The computer storage medium of claim 11, where the format comprises a container format, the hierarchical structure supports combinations of different multimedia streams having corresponding different codecs, the stored data comprises first media content of a first format having a first corresponding codec, and the operations comprise adding second media content of a second format having a second corresponding codec to the electronic document, where the new data of the given size is associated with the second media content.

13. A system comprising:
a user device; and
one or more computers operable to interact with the device and to perform operations comprising:
obtaining new data of a given size to be added to an electronic document conforming to a format comprising a hierarchical structure, where the electronic document includes stored data and free spaces at different nodes within the hierarchical structure;
determining whether a first node in the hierarchical structure includes a first free space of a size sufficient to accommodate the new data of the given size;
using the first free space in the first node to add the new data to the electronic document in a storage device when the size of the first free space is sufficient; and
when the size of the first free space is insufficient:
identifying a second node in the hierarchical structure that includes a second free space,
moving at least some of the second free space to the first free space, thereby increasing the size of the first free space, and
using the increased first free space in the first node to add the new data to the electronic document in a storage device.

14. The system of claim 13, wherein the one or more computers comprise a server operable to interact with the device through a data communication network, and the device is operable to interact with the server as a client.

15. The system of claim 13, wherein the one or more computers consist of one computer, the device is a user interface device, and the one computer comprises the user interface device.

16. The system of claim 13, where identifying the second node comprises checking sizes of multiple free spaces to find sufficient free space for the new data of the given size, and moving the at least some of the second free space comprises rewriting a portion of the electronic document including the multiple free spaces.

17. The system of claim 13, where the hierarchical structure comprises multiple levels, identifying the second node comprises checking one or more nodes at a peer level of the first node before checking any other levels, and the operations comprise checking a total amount of document rewriting to be performed before moving the at least some of the second free space and using the increased first free space.

18. The system of claim 13, where the hierarchical structure comprises a tree data structure linearized in the electronic document, and identifying the second node comprises looking for free space in order of distance from the first node in the linearized electronic document.

19. The system of claim 13, the operations comprising parsing the electronic document to check document validity with respect to the format, where the parsing comprises creating a model in memory of the hierarchical structure of the electronic document, and identifying the second node comprises checking the model in memory for free space.

20. The system of claim 19, where the format comprises a container format, the hierarchical structure supports combinations of different multimedia streams having corresponding different codecs, the stored data comprises first media content of a first format having a first corresponding codec, and the operations comprise adding second media content of a second format having a second corresponding codec to the electronic document, where the new data of the given size is associated with the second media content.

* * * * *